Figure 1:
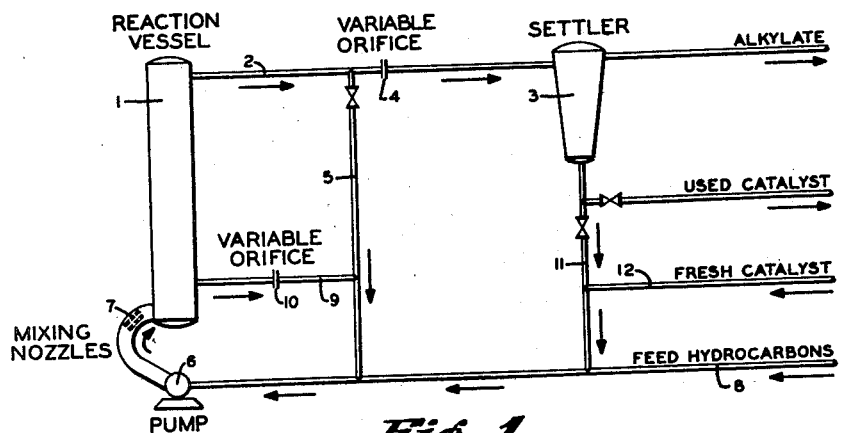

Dec. 24, 1946.    G. B. HATCH ET AL    2,413,105
ALKYLATION OF HYDROCARBONS
Original Filed Aug. 30, 1939

G. B. HATCH
E. F. PEVERE
L. A. CLARKE
F. H. BRUNER
INVENTORS

BY
THEIR ATTORNEYS

Patented Dec. 24, 1946

2,413,105

UNITED STATES PATENT OFFICE 2,413,105

ALKYLATION OF HYDROCARBONS

George B. Hatch and Ernest F. Pevere, Beacon, Louis A. Clarke, Fishkill, and Frank H. Bruner, Beacon, N. Y., assignors, by mesne assignments, to The Texas Company, New York, N. Y., a corporation of Delaware Original application August 30, 1939, Serial No. 292,582. Divided and this application January 7, 1941, Serial No. 373,416

10 Claims. (Cl. 260—683.4)

This invention relates to the alkylation of hydrocarbons and particularly to the alkylation of isoparaffins with olefins in the presence of a liquid or fluid catalyst for production of gasoline, and has to do particularly with the operation of an alkylation process.

The present application is a division of Serial No. 292,582, filed August 30, 1939, for Alkylation of hydrocarbons, now Patent No. 2,267,097, dated December 23, 1941.

The invention has to do with an alkylation process wherein olefin and paraffin hydrocarbons are introduced to a reaction vessel and therein subjected to alkylation in the presence of a catalyst such as concentrated sulphuric acid, hydrated borontrifluoride and other alkylation catalysts, either with or without a promoter. According to the invention a mixture of hydrocarbons and catalyst is continuously withdrawn from one portion of the reaction vessel and recycled to another portion under conditions of high velocity fluid flow so as to impart a high degree of agitation or turbulence to the fluid contents of the vessel.

Thus, a stream of hydrocarbons and catalyst comprising products of reaction may be continuously withdrawn from the top or upper portion of a vertical reaction vessel and a predetermined portion thereof recycled to the reaction vessel. That portion not recycled is subjected to settling so as to stratify and form a hydrocarbon layer and a catalyst layer. The hydrocarbon layer is removed and subjected to such further treatment as may be desired, while the catalyst layer is withdrawn and at least a portion thereof also recycled to the reaction vessel.

An important object of the invention involves withdrawing from the bottom or lower portion of the reaction vessel a portion of the liquid contents and returning this withdrawn liquid in a stream or streams flowing under high velocity so as to impart sufficient agitation to the contents of the reaction vessel in order to avoid formation of relatively stagnant pools of liquid catalyst within the vessel.

In an alkylation process it is essential to achieve this object in order to realize efficient use of the catalyst, as well as to avoid catalyst deterioration, and also in order to avoid overtreating certain constituents and under-treating other constituents of the hydrocarbons undergoing treatment.

The invention is of particular application in the alkylation of low-boiling isoparaffins, such as isobutane or isopentane, with olefins, such as $C_3$ and $C_4$ olefins, for the production of high anti-knock gasoline hydrocarbons.

In carrying out the alkylation treatment in a continuous manner it is usual to pass the hydrocarbons to a tower or reaction vessel wherein they are subjected to alkylation while in contact with an alkylation catalyst, such as concentrated sulphuric acid, under predetermined conditions of temperature and time of reaction, concentration of acid, and ratio of acid to hydrocarbons.

The reacted mixture is drawn off in a continuous stream and introduced to a settling vessel, where stratification occurs, with the formation of a hydrocarbon layer comprising alkylated hydrocarbons, as well as unreacted hydrocarbons, and an acid layer comprising used acid. All or a portion of the used acid may be recycled to the reaction vessel, while the hydrocarbon layer is subjected either to further contact with the catalyst in a subsequent stage, or else neutralized and fractionated to remove the unreacted hydrocarbons, such as isoparaffins, which are returned to the system for alkylation with additional olefins.

A portion of the reacted mixture drawn off from the reaction vessel may be recycled directly to the reaction vessel without subjecting it to settling, as above described.

In such an operation there is a tendency for settling or stratification to occur within the reaction vessel, due to the difference in specific gravity between the hydrocarbons and the alkylation catalyst, for example, concentrated sulphuric acid. As a result, the acid tends to be concentrated in the bottom or lower portion of the reaction vessel, due to settling. Relatively stagnant pools of acid may thus accumulate within the lower portion of the vessel, and this is undesirable, from the standpoint of realizing the most efficient use of the catalyst and also the avoidance of either under or over-treatment of certain constituents of the hydrocarbons.

Accordingly, the present invention involves reducing the amount of settling and concentration of acid within the reaction vessel by continuously removing some of the concentrate from the lower portion of the vessel, mixing with feed hydrocarbons and introducing the mixture to another portion of the vessel in a highly turbulent state. It also involves maintaining efficient agitation within the vessel.

The invention will be understood more fully by reference to the figures of the accompanying drawing.

The drawing illustrates, in each figure, a single reaction unit comprising reaction and settling vessels, although it is contemplated that a plurality of such stages may be employed, using in each stage the method or methods of recycling described herein.

As indicated in Fig. 1, the reaction vessel comprises a tower 1 and wherein the olefin and isoparaffin hydrocarbons are subjected to contact with a catalyst, such as concentrated sulphuric acid. The liquid mixture of unreacted hydrocarbons, alkylate and catalyst, accumulating in the top of the vessel, is continuously drawn off through a conduit 2, leading to a settler 3.

The settler 3 is advantageously of conical shape, as indicated, so as to facilitate removing the separated catalyst from the hydrocarbons as rapidly and as completely as possible and thereby to reduce to a minimum the time of contact between catalyst and hydrocarbons after introduction to the settler.

The conduit 2 contains an orifice or valve 4 adapted to control the amount of liquid mixture passing to the settler 3. That portion not passed to the settler 3 is by-passed through a conduit 5, communicating with a recycle pump 6. The pump 6 discharges through nozzles 7, which in turn discharge into the bottom of the reaction vessel 1.

The feed hydrocarbons, together with recycled isoparaffin hydrocarbons, may be introduced to the suction side of the pump through a pipe 8.

In operation a stream of liquid mixture is continuously withdrawn from the lower portion of the reaction vessel 1 through a pipe 9 containing a controlled orifice 10. The pipe 9 communicates with the conduit 5 previously mentioned, so that the liquid mixture withdrawn through the pipe 9 is conducted to the suction side of the pump 6 and there commingled with fresh feed hydrocarbons and recycled isoparaffin hydrocarbons prior to passage through the nozzles into the bottom of the vessel 1.

The used catalyst withdrawn from the settler 3 is passed, all or in part, through a conduit 11, also communicating with the suction side of the pump 6. Fresh catalyst, added as makeup, may be introduced through a pipe 12, communicating with pipe 11, previously mentioned.

The circulating stream of hydrocarbon and catalyst passing through the pump 6 may contain a ratio of catalyst to hydrocarbon of about 1:1 by volume. Where the catalyst is sulphuric acid the concentration is maintained in the range of about 90 to 100% $H_2SO_4$.

The ratio of circulated hydrocarbon to fresh feed hydrocarbon is maintained high and may range between about 5:1 and 100:1, and preferably between about 10:1 and 30:1.

The orifices 4 and 10 are regulated so that the recycled hydrocarbon catalyst mixture passing through the pipe 9 is sufficient to prevent formation of a pool of separated catalyst in the lower portion of the reactor. This, of course, depends upon a number of factors, including the efficiency of agitation, catalyst ratio, and nature of catalyst. In general, the proportion withdrawn through pipe 9 is less than the overflow through pipe 2, and may comprise about 5-75% of the latter.

Figure 2:
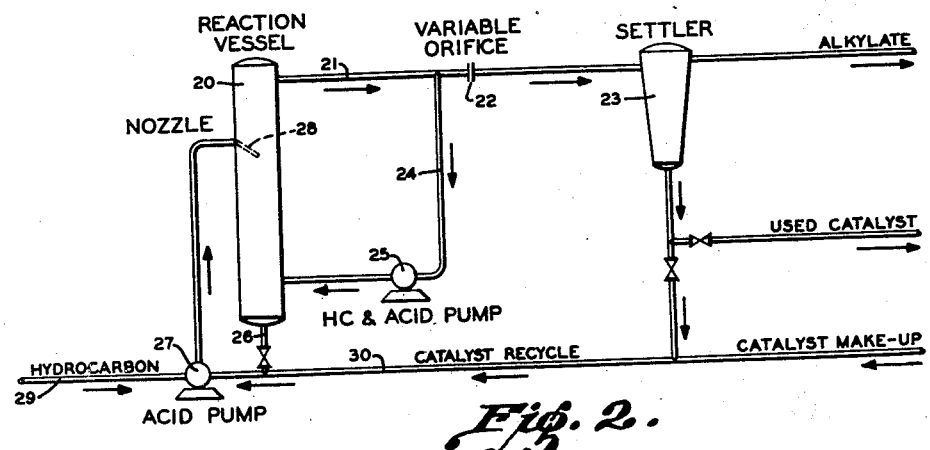

Fig. 2 likewise shows a reaction vessel 20 provided with an overflow pipe 21 through which the mixture of unreacted hydrocarbons, alkylate and catalyst accumulating in the top of the vessel is drawn off. The pipe 21 is provided with a controlled orifice 22, controlling the proportion of the drawn-off mixture passing to a settler 23, similar to the settler 3 described in connection with Fig. 1.

That portion of the withdrawn mixture not passing to the settler 23 flows through a pipe 24 communicating with the suction side of a pump 25 and by which means it is reintroduced to the lower portion of the reaction vessel 20.

Catalyst with some hydrocarbon accumulating in the bottom of the reaction vessel 20 is withdrawn through line 26 by a pump 27, which discharges this liquid through a nozzle or nozzles 28, discharging into the upper portion of the reaction vessel 20.

Feed hydrocarbons, together with recycled isoparaffin hydrocarbons, are introduced to the suction side of the pump 27 through a pipe 29. Used catalyst, withdrawn from the bottom of the settler 23, together with any makeup catalyst, is conducted by a pipe 30 communicating with the pipe 26, leading to the suction side of the pump 27.

Thus, one feature of the method of flow illustrated in Fig. 2 involves the realizing of countercurrent flow within the vessel between the recycled liquid discharged through the nozzles 28 and the recycled liquid introduced to the lower portion of the vessel by the pump 25.

Figure 3:
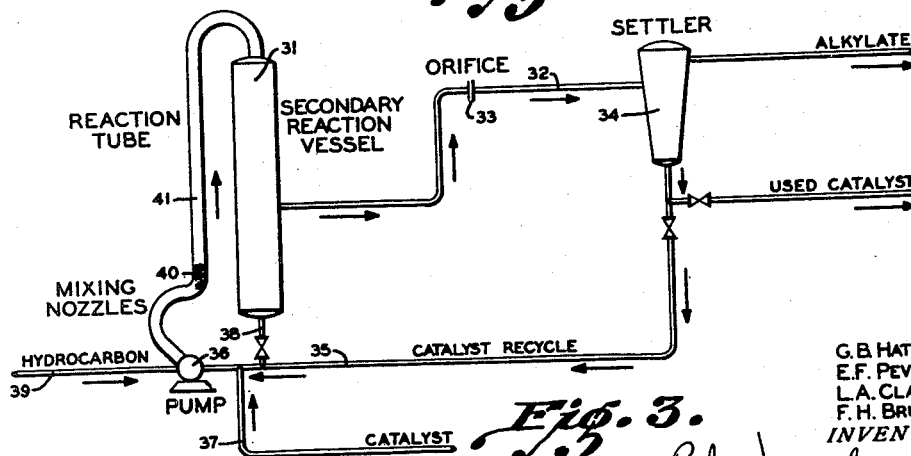

In Fig. 3, fresh feed from line 39, recycle catalyst from line 35, fresh catalyst from line 37, and catalyst-hydrocarbon mix from line 38 are mixed and forced by pump 36 through mixing nozzles 40 into reaction tube 41, which discharges into the upper portion of secondary reaction vessel 31. A controlled proportion of reaction products is continuously withdrawn from an intermediate point of vessel 31 by line 32 containing orifice 33. Pipe 32 preferably discharges from vessel 31 at a point varying from about one-half to three-quarters of the height of the vessel.

The withdrawn liquid is passed to a separator 34, by which means the hydrocarbons are separated from the used catalyst. The used catalyst, all or in part, is returned by pipe 35 to the suction side of a recycling pump 36.

The suction side of the pump 36 also communicates through a pipe 38, with the bottom of the reaction vessel 31, thereby drawing off such portion as may be desired of the liquid mixture accumulating in the bottom of the vessel.

The recycled hydrocarbons, feed hydrocarbons, and the recycled catalyst, together with makeup catalyst, etc., are brought into intimate contact by pump 36 and forced through nozzles 40, as previously described, into tube 41, which is a relatively long conduit of restricted cross-sectional area, and therefore adapted to prolong the effect of agitation and turbulent flow as the fluid discharged through the nozzles 40 rises therethrough.

A certain amount of settling is permitted in the reaction vessel 31 so as to permit drawing off a stream rich in hydrocarbons through the pipe 32, while recycling through the pipe 38 a mixture richer in catalyst.

While single stage operations have been illustrated in the drawing, it is contemplated that the methods of flow described may be used for multiple stage operations and, in which case, the feed hydrocarbons may be introduced in part to each stage or to as many of the stages as may be desired.

Obviously many modifications and variations of the invention, as hereinbefore set forth, may be made without departing from the spirit and scope thereof, and only such limitations should be imposed as are indicated in the appended claims.

We claim:

1. In the continuous alkylation of an isoparaffin with an olefin in the presence of an immiscible alkylation catalyst of greater density than the hydrocarbons undergoing treatment, wherein the feed hydrocarbons are continuously introduced into a closed circuit containing recirculating emulsion of mixed catalyst and hydrocarbons undergoing reaction and constituting an alkylation reaction zone, and a portion of the recirculating emulsion stream is continuously diverted to a separating zone where catalyst phase is settled from hydrocarbon phase and both phases are continuously discharged from the separating zone, and at least a portion of the separated catalyst phase is recycled to the alkylation reaction zone, the improvement which comprises removing the separated catalyst from the separating zone as rapidly and completely as possible to thereby reduce to a minimum the time of contact between catalyst and hydrocarbon after separation from the emulsion.

2. In the continuous alkylation of an isoparaffin with an olefin in the presence of strong sulfuric acid of about 90–100% strength, wherein the feed hydrocarbons are continuously introduced on the suction side of a recirculating pump into a flowing stream of emulsion of mixed acid and hydrocarbons undergoing reaction, the flowing stream is forced with turbulent flow through a restricted flow passage under alkylating conditions, and the mixture then passes through an enlarged flow passage, from which a portion of the acid and hydrocarbons is returned to the suction side of the pump for recirculation through the system and a portion of the acid and hydrocarbons is diverted to a settling zone where acid is settled from hydrocarbons, and settled acid is withdrawn from said settling zone and at least a portion thereof is recycled to the recirculating emulsion stream, the improvement which comprises removing the settled acid from the settling zone as rapidly and as completely as possible to thereby reduce to a minimum the time of contact between acid and hydrocarbons after separation from the emulsion.

3. In the continuous alkylation of a low-boiling isoparaffin with an olefin in the presence of an immiscible alkylation catalyst of greater density than the hydrocarbons undergoing treatment, the process which comprises maintaining two zones of reaction in series, the first of which comprises an initial zone of reaction wherein feed hydrocarbons are introduced into a flowing stream of emulsion of mixed catalyst and hydrocarbons undergoing reaction and the mixture is agitated under alkylating conditions, and the second of which comprises a secondary relatively quiescent reaction zone into which emulsion from the first zone flows and wherein partial settling of the emulsion occurs forming a lower mixture richer in catalyst and an upper mixture richer in hydrocarbons, continuously recycling from the said second zone a stream of the mixture which has only partially settled and which is richer in catalyst but which has not formed a settled catalyst layer to the said first reaction zone to provide the said flowing stream of emulsion therein, and continuously withdrawing from the said second zone a stream of the mixture richer in hydrocarbons and passing said stream to a second settling zone where remaining catalyst is settled from hydrocarbons.

4. The method according to claim 3, wherein the catalyst is strong sulfuric acid of about 90–100% strength.

5. The method according to claim 3, wherein the said second zone comprises a chamber of enlarged cross-sectional area over the cross-sectional area of the said first zone and into which chamber the stream of emulsion from the said first zone enters at an upper portion thereof, and the stream of mixture richer in catalyst is withdrawn from a lower portion of said chamber, while the stream of mixture richer in hydrocarbons is withdrawn from an intermediate portion thereof.

6. The method according to claim 3, wherein the remaining catalyst settled from hydrocarbons in said second settling zone is separated from the hydrocarbons as rapidly and completely as possible to thereby reduce to a minimum the time of contact between catalyst and hydrocarbons after separation from the emulsion.

7. In the continuous alkylation of a low-boiling isoparaffin with an olefin in the presence of an immiscible alkylation catalyst of greater density than the hydrocarbons undergoing treatment, the process which comprises continuously feeding the hydrocarbons into a flowing emulsion stream of mixed catalyst and hydrocarbons undergoing reaction, passing the flowing stream through a restricted flow passage with turbulent flow under alkylating conditions, then introducing the stream into the upper portion of an enlarged secondary reaction chamber providing relatively quiescent flow where additional reaction time is provided and partial settling of catalyst from hydrocarbons occurs to form a lower mixture richer in catalyst and an upper mixture richer in hydrocarbons, continuously recycling from said enlarged chamber a stream of the mixture which has only partially settled and which is richer in catalyst but which has not formed a settled catalyst layer to the said restricted flow passage to form the flowing emulsion stream into which the feed hydrocarbons are introduced, and continuously diverting from an intermediate portion of said enlarged chamber a stream of the mixture richer in hydrocarbons and passing said stream to a quiescent settling zone where remaining catalyst separates from the hydrocarbons.

8. In an alkylation process in which an emulsion of reactive hydrocarbons and strong mineral acid is maintained and circulated in a circulatory system comprising a reaction zone and a primary settling zone, the improved method which comprises partially settling the emulsion entering said primary settling zone to form an upper layer of emulsion which is rich in hydrocarbons and a lower layer of emulsion which is richer in acid, recycling the said lower layer of emulsion to the reaction zone before a settled acid layer has formed therefrom, separately withdrawing the said upper layer of emulsion from the said primary settling zone and diverting the same to a secondary settling zone wherein substantially complete separation of acid from hydrocarbons is effected.

9. In the continuous alkylation of a low-boiling isoparaffin with an olefin in the presence of an acid alkylation catalyst of greater density than the hydrocarbons undergoing treatment, the process which comprises maintaining two zones in series, the first of which comprises an initial zone of reaction wherein feed hydrocarbons are introduced into a flowing stream of emulsion of mixed catalyst and hydrocarbons undergoing reaction and the mixture is agitated under alkylating conditions, and the second of which comprises a secondary reaction zone into which emulsion from the first zone flows and wherein partial settling of the emulsion occurs, forming a lower emulsion richer in catalyst and an upper emulsion richer in hydrocarbons, continuously recycling a stream of the emulsion richer in catalyst before the same has separated into a settled acid catalyst layer from the said second zone to the said initial reaction zone to provide the said flowing stream of emulsion therein, and continuously withdrawing from the said secondary reaction zone a stream of the emulsion richer in hydrocarbons and passing said stream to a settling zone where remaining catalyst is settled from hydrocarbons.

10. Process for the continuous alkylation of an isoparaffin with an olefin in the presence of alkylation catalyst which comprises maintaining zones of agitated reaction, partial settling and more complete settling in series, continuously feeding the isoparaffin and olefin into the agitated reaction zone containing an emulsion of hydrocarbons and alkylation catalyst under alkylating conditions, passing emulsion from said reaction zone to the partial settling zone where incomplete settling of emulsion occurs, recycling partially but incompletely settled emulsion from one elevation of said partial settling zone to said reaction zone before the said emulsion has separated into a settled catalyst layer, passing additional emulsion from a different and higher elevation of said partial settling zone to said more complete settling zone where a separate hydrocarbon phase is formed, and recovering alkylate from said hydrocarbon phase.

GEORGE B. HATCH.
ERNEST F. PEVERE.
LOUIS A. CLARKE.
FRANK H. BRUNER.